United States Patent [19]
Dowell et al.

[11] 3,759,354
[45] Sept. 18, 1973

[54] BRAKE DISC STRUCTURE

[75] Inventors: Frederick S. Dowell; Benedict P. Healy, both of Coventry, Warwickshire, England

[73] Assignee: Dunlop Limited, London and Birmingham, England

[22] Filed: Mar. 1, 1972

[21] Appl. No.: 230,632

[30] Foreign Application Priority Data
Mar. 2, 1971   Great Britain..................... 5,738/71

[52] U.S. Cl. ...... 188/218 XL, 188/73.2, 188/251 A, 192/70.13, 192/107 R
[51] Int. Cl.............................................. F16d 65/12
[58] Field of Search .................... 188/73.2, 218 XL, 188/251 A, 250 G, 234; 192/107 R, 107 M, 70.13

[56] References Cited
UNITED STATES PATENTS

| | | | |
|---|---|---|---|
| 2,767,817 | 10/1956 | Davis............................ | 188/218 XL |
| 3,452,844 | 7/1969 | Lattemant..................... | 188/218 XL |
| 1,796,433 | 3/1931 | Blume............................ | 188/234 X |
| 2,059,576 | 11/1936 | Glick.............................. | 192/107 R |
| 3,552,533 | 1/1971 | Nitz ............................. | 188/251 A X |
| 3,605,967 | 9/1971 | Warren et al.................. | 188/73.2 X |

*Primary Examiner*—George E. A. Halvosa
*Attorney*—John A. Young

[57]   ABSTRACT

An annular brake disc having an annular braking member on which at least one radially-extending face is furnished with a friction facing which is provided by a series of segmental-shaped friction pads that are secured to the braking member. Each friction pad is constructed of a soft or brittle material such as carbon and has at least one substantially straight edge. In order to transmit braking loads, this edge is chamfered so as to fit into a corresponding inclined undercut abutment face in the member, of which the following is a specification.

10 Claims, 15 Drawing Figures

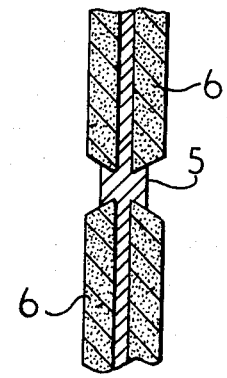
SECTION A-A FIG. 2.
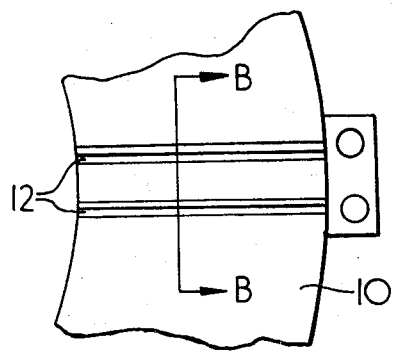
FIG. 3.
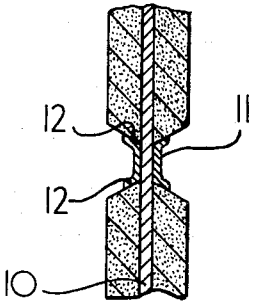
SECTION B-B FIG. 4.

Patented Sept. 18, 1973 3,759,354
7 Sheets-Sheet 3
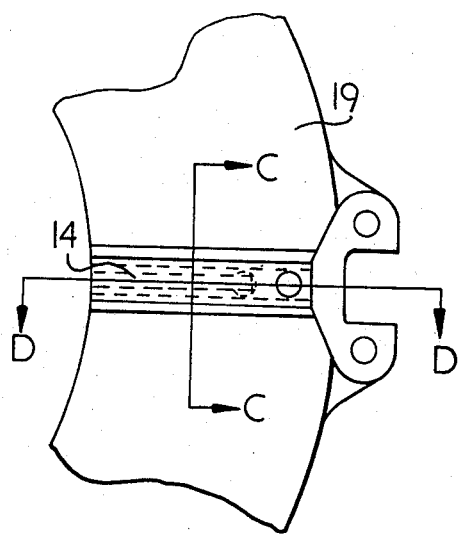
FIG.5.
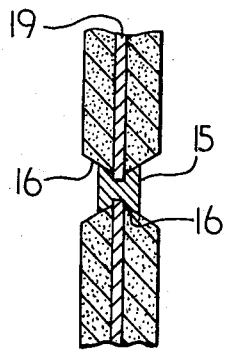
SECTION C-C FIG.6.
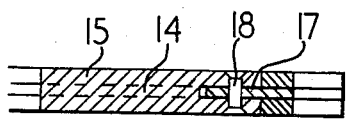
SECTION D-D FIG.7.

Patented Sept. 18, 1973

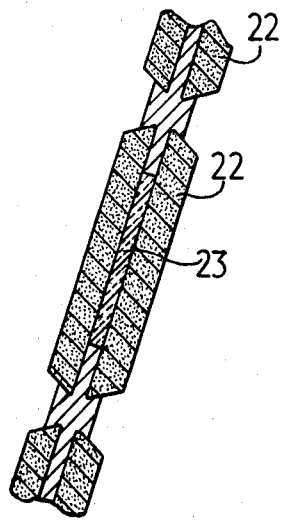
SECTION E-E FIG.9.
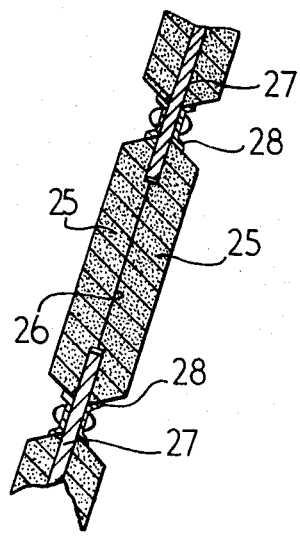
FIG.10.

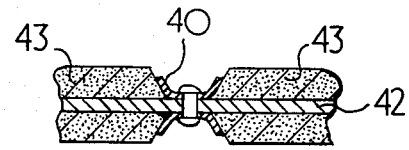
SECTION F-F FIG.13.
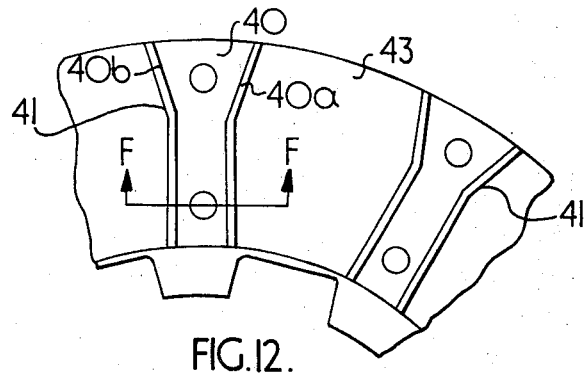
FIG.12.
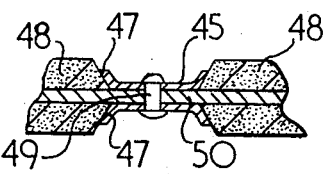
SECTION G-G FIG.15
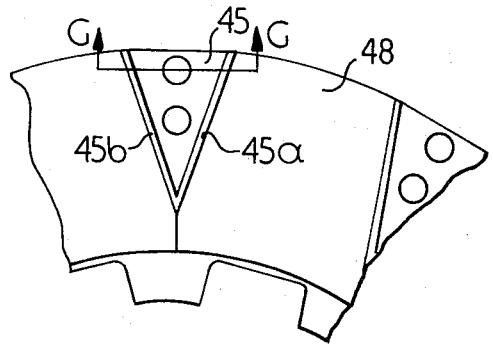
FIG.14.

BRAKE DISC STRUCTURE

This invention relates to brakes and more particularly to friction members for brakes.

Materials used in brake friction elements may have relatively weak structural properties, and problems arise in attaching such elements to the relatively strong supporting members which have to be provided to enable braking loads to be transmitted. This problem is particularly acute in aricraft brakes, where very high temperature, pressure and torque loads are encountered, and this tends to restrict the choice of friction materials available to the designer. One material which is particularly difficult to secure satisfactorily to a braking member is carbon, which on account of its high frictional and heat capacity properties together with its low density is otherwise a particularly attractive material for use in an aircraft brake.

One object of the present invention is to provide a brake mamber, suitable for use as a rotor or stator member in an aircraft brake; incorporating friction pads of carbon or other soft or brittle material and in which the pads are securely fixed to a backing member.

According to the invention an annular brake disc comprises an annular backing member having at least one radially-extending face furnished with a friction facing provided by a series of segmental-shaped friction pads secured to the backing member, the friction elements each being of soft or brittle material such as carbon and each having at least one substantially straight edge which is chamfered so as to fit into and transmit braking torque loads to a correspondingly inclined undercut abutment face associated with the backing member.

Preferably, both edges of each of the pads are chamfered so as to fit into corresponding undercut faces on the backing member, the pads being held by the abutments against circumferential movement in either direction.

Various embodiments of the invention will now be described, by way of example with reference to the accompanying drawings in which:

FIG. 2 is a sectional view on the line A—A of FIG. 1 showing the assembly of the friction pads on the brake member;

FIG. 3 is a view similar to FIG. 1 showing a second embodiment of the invention;

FIG. 4 is a sectional view on the line B—B of FIG. 3;

FIG. 5 is a view similar to FIGS. 1 and 3 showing a third embodiment of the invention;

FIG. 6 is a sectional view on the line C—C of FIG. 5;

FIG. 7 is a sectional view on the line D—D of FIG. 5;

FIG. 9 is a sectional view along the line E—E of FIG. 8;

FIG. 10 is a view similar to that of FIG. 9 showing a fifth embodiment of the invention;

FIG. 12 is a view of part of a brake disc assembly as seen in a direction parallel to the axis of rotation of the disc showing a seventh embodiment of the invention;

FIG. 13 is a sectional view on the line F—F of FIG. 12 showing the assembly of the friction pads on the brake member;

FIG. 14 is a view similar to FIG. 12 showing an eighth embodiment of the invention, and FIG. 15 is a sectional view on the line G—G of FIG. 14.

Figure 1:
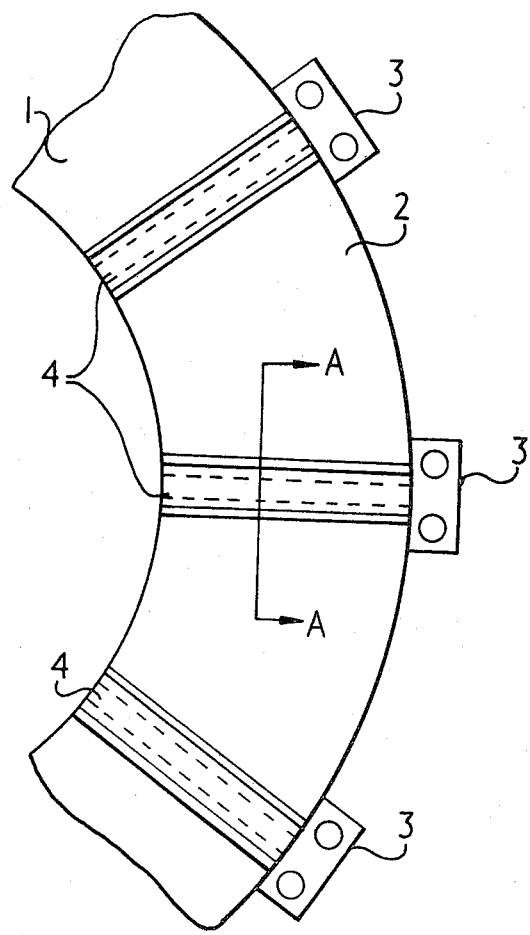
FIG. 1 is a view of part of the brake disc assembly as seen in a direction parallel to the axis of rotation of the disc.

In a first embodiment, shown in FIG. 1, a rotor 1 for an aircraft brake of the multi-disc type comprises an annular backing member 2 in the form of a steel disc having radially projecting drive dogs on its outer circumference. The disc 2 is machined on each face so as to provide recesses 4 of segmental shape into which carbon friction pads 6 are to be secured. The recesses, of which there may be 10 on each face, are bounded by integrally formed radially-extending abutment strips (FIG. 2) which are undercut at each side to form inclined abutment faces 5 into which correspondingly chamfered edges of the adjacent friction pads 6 are arranged to fit in dove-tail fashion.

The arrangement is such that each pad is located against circumferential movement in either direction by the wedging engagement of the appropriate chamfered edge of the pad 6 into the associated abutment face 5. This subjects the friction pad almost entirely to compression stresses in the abutment zone, and these stresses can be resisted by the relatively soft material of the friction pad very much more easily than tensile or shear stresses.

Each friction pad is located against radially inward movement by the radial wedging action as it moves inwardly between the two associated abutments, and is prevented from moving outwardly by small metal keep plates 3 rivetted onto the drive dogs.

The backing member 2 may alternatively be of a Nickel based refractory alloy or molydenum to withstand higher temperatures, or may be of Beryllium. Where a Beryllium backing member is used it may be preferable to use relatively thin pads with a relatively thick backing member so as to utilise the high heat capacity of the Beryllium. In other constructions the carbon pads 6 would normally be thick relative to the thickness of the backing member and would provide the major contribution to the heat capacity of the brake member. The backing member may also be constructed of carbon with carbon fibre reinforcement.

In a second embodiment, shown in FIGS. 3 and 4, the backing member 10 is not machined to provide the recesses for the friction pads, instead the undercut abutment faces 12 are constituted by suitably shaped channel section strips 11 of metal rivetted or welded to the backing member.

In a third embodiment shown in FIGS. 5, 6 and 7, the radially-extending thermal relief slots 14 which are commonly provided in a brake disc are employed to provide locating means for a pre-formed abutment strip 15. The abutment strip 15 is of H-shaped cross-section so as to fit into the thermal relief slot 14 and carries inclined abutment surfaces 16 on the two portions which project on each side of the disc 19. Since the thermal relief slot does not extend through the whole radial width of the brake disc, the central portion of the H-section strip at one end is machined away so that the two separate limbs thus formed can embrace the non-slotted portion of the disc 17, and the strip is secured to the disc by a rivet 18 through this portion.

Figure 8:
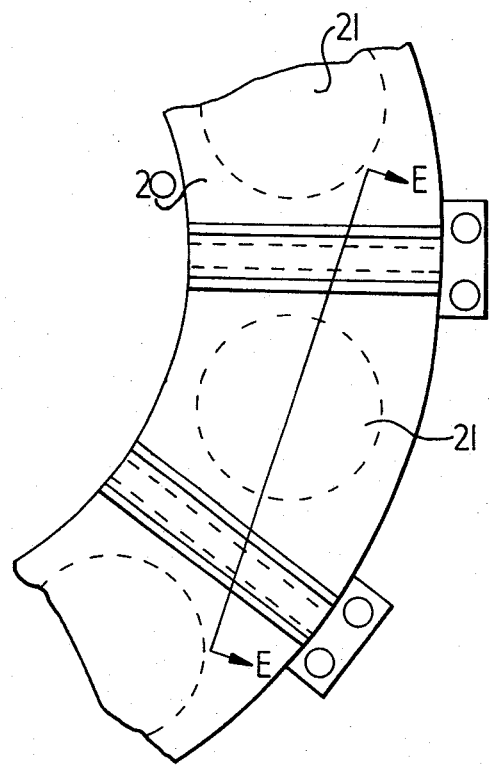
FIG. 8 is a view similar to FIGS. 1, 3 and 5 showing a fourth embodiment of the invention.

In a fourth embodiment shown in FIGS. 8 and 9, the backing member 20 is formed with a series of apertures 21, for example circular, one for each pair of friction pads 22 located one on each side of the backing member 20. The abutment members may be formed as in any of the examples described above, and the apertures incorporate plates 23 of heat absorbing material, which may be the same material as that of the friction pads, fitted within the apertures.

In a fifth embodiment, shown in FIG. 10, apertures are provided as described with reference to the fourth embodiment, and the opposed friction pads 25 on each side of the aperture are formed with projections which each fit within the aperture and meet in the central plane 26 of the backing member 27 to provide an uninterrupted heat path through the brake member. In this example the abutment strips 28 must be of the kind which is secured to the backing member 27 rather than that which is formed integrally therewith, since the pads 25 have to be placed in position on the backing member 27 before the abutment strips 28 are placed in position.

Figure 11:
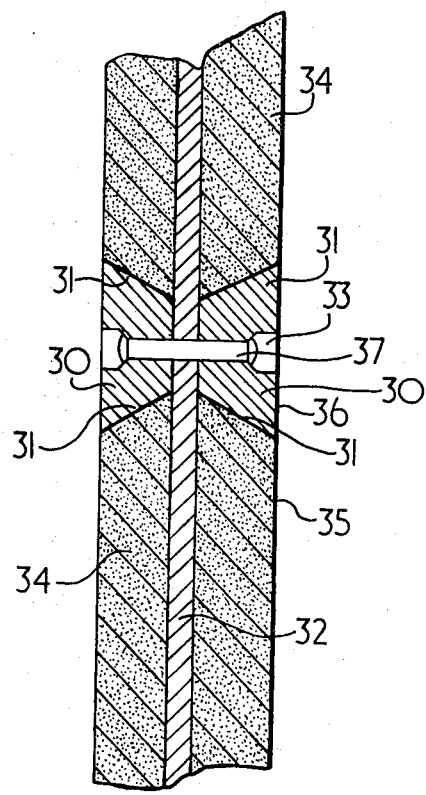
FIG. 11 is a view similar to that of FIG. 9 showing a sixth embodiment of the invention.

In a sixth embodiment of the invention shown in FIG. 11, the abutment strips 30 are of carbon/carbon fibre reinforced composite material arranged in such a manner that the carbon fibres extend in a radial direction relative to the backing member 32. The abutment strips may also be constructed of any reinforced composite material having friction and wear properties compatible with those of the friction pads. Each abutment strip 30 is of wedge-shaped section and carries inclined surfaces 31 on each longitudinal side which abut correspondingly chamfered surfaces of the carbon friction pads 34. The abutment strips and backing member 32 are provided with a number of axial drillings 33 countersunk at each end to take a rivet 37. The rivet 36 attaches an abutment strip 30 to each side of the backing member 33 and thereby secures the friction pads 34 to the member 32. The abutment strips may be so constructed that the axial outward faces 35 of the friction pads 34 are flush with the outward face 36 of the carbon fibre reinforced abutment strips 30 and serve as part of the friction surface of the brake. Alternatively the outward faces 36 of the carbon fibre reinforced abutment strips may be positioned in a plane axially inwardly of the face 35 of the friction pads 34.

Where the brake disc is a stator member, the radially projecting drive dogs are positioned on the inner circumference and therefore in the absence of drive dogs on the outer circumference of the backing member, the keep plates may be attached directly to the backing member.

Alternatively, in a seventh embodiment, as shown in FIGS. 12 and 13, abutment strips (40) are provided with a Y-shaped outwardly flared portion 41 adjacent the outer circumference of the backing member 42. The friction pads 43 are correspondingly shaped to accommodate this flared end portion and the combination of the flared abutment strip 40 and the pads 43 causes a wedging action which prevents radial outward movement of the pads.

In an eighth embodiment of the invention, shown in FIGS. 14 and 15, the abutment member 45 is in the form of a triangular wedge 45 carrying the undercut abutment faces 47 corresponding to the chamfered edges of adjacent friction pads 48 which are cut away to accommodate the abutment member and act to prevent radial outward movement without the need for additional keep plates. The wedge shaped abutment member is secured by rivets 49 to the backing member 50 preventing radial and circumferential movement of the friction pads 48.

In order to provide adequate retention of the friction pads the triangular abutment member is provided with an included angle between its sides 45a and 45b greater than $360/n°$ where $n$ is the number of abutment members on one side of each backing member. This also applies to the included angle between sides 40a and 40b of the Y shaped portion of the abutment member as shown in FIG. 12.

The friction members described above have the advantage that the carbon pads are not secured by rivets or screws which would pass through the pad and for which holes would need to be provided in the pad. Such holes would weaken the pad and would necessitate the provision of a reinforcement for the carbon which gives rise to considerable practical difficulties.

We claim:

1. An annular brake disc comprising an annular backing member, a number of circumferentially spaced abutment members secured to the backing member and arranged to extend radially relative to said backing member, and a series of circumferentially-spaced friction pads of soft or brittle material such as carbon secured to the backing member by the abutment members, each pad being provided with two substantially straight chamfered edges which each respectively cooperate with undercut abutment faces provided on the associated abutment members so as to transmit braking torque loads from the pads to the backing member without failure of the pad material, a portion at least of each abutment face being arranged to extend at an angle to the mean radius of the backing member along which the respective abutment member extends whereby the tendency of the friction pads to move radially outwardly under the action of the resultant frictional force acting on the pads during use is restrained.

2. A brake disc according to claim 1 wherein the backing member is provided with a separately formed abutment member of reinforced composite material having wear properties compatible with those of the friction pads.

3. A brake disc according to claim 1 wherein the abutment member is generally Y-shaped when viewed in the axial direction of the disc having an outwardly flared portion adjacent the outer circumference of the backing member so as to prevent radially outward movement of the associated pads.

4. A brake disc according to claim 1 comprising an annular backing member having radially projecting drive dogs from one circumferential edge.

5. A brake disc according to claim 1 wherein the backing member is constructed of a Nickel based refractory alloy.

6. A brake disc according to claim 1 wherein the backing member is constructed of Molybdenum.

7. A brake disc according to claim 1 wherein the backing member is constructed of Beryllium.

8. A brake disc according to claim 1 wherein the backing member is constructed of carbon reinforced with carbon fibres.

9. A brake disc according to claim 1 wherein the friction pads are located in pairs comprising one pad on each side of the backing member and the portion of the backing member between the pads of each pair of friction pads is provided with an aperture incorporating heat absorbing material.

10. A brake disc according to claim 9 wherein at least one of each pair of friction pads is formed with a projection extending within the aperture to contact the other friction pad so as to provide an uninterrupted heat path through the brake disc.

* * * * *